Sept. 3, 1968 H. BUBBER 3,400,228
METHOD AND CIRCUIT ARRANGEMENT FOR CENTRAL SUPERVISION OF TIME MEASURING CIRCUITS OF SEVERAL FUNCTIONAL UNITS IN TELECOMMUNICATIONS, PARTICULARLY TELEPHONE EXCHANGE SYSTEMS
Filed June 7, 1965
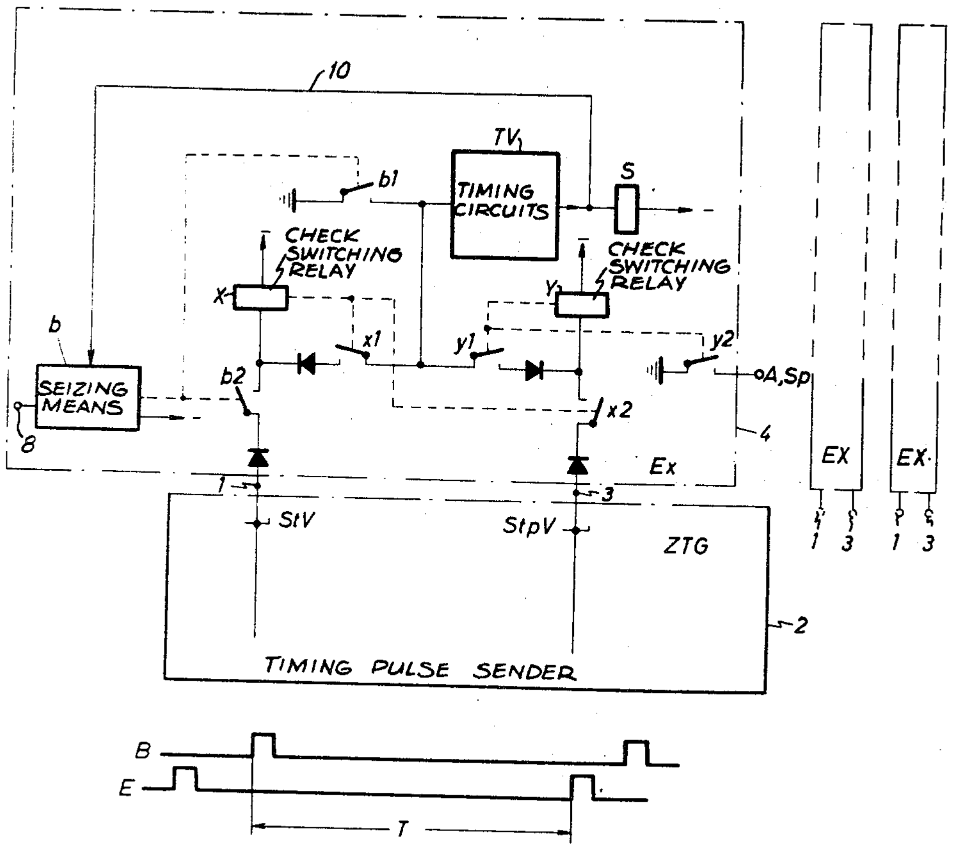

3,400,228
Patented Sept. 3, 1968

3,400,228

METHOD AND CIRCUIT ARRANGEMENT FOR CENTRAL SUPERVISION OF TIME MEASURING CIRCUITS OF SEVERAL FUNCTIONAL UNITS IN TELECOMMUNICATIONS, PARTICULARLY TELEPHONE EXCHANGE SYSTEMS

Heinz Bubber, Munchingen, Germany, assignor to International Standard Electric Corporation, New York, N.Y., a corporation of Delaware Filed June 7, 1965, Ser. No. 461,813
Claims priority, application Germany, June 20, 1964, St 22,284
7 Claims. (Cl. 179—175.2)

ABSTRACT OF THE DISCLOSURE

Supervision of a functional unit is maintained by providing checking pulses at the beginning and at the end of a specified time period. If the functional unit is in operation at both times, failure is evident and a trouble signal is provided.

The invention relates to a method and to a circuit arrangement for central supervision of time-measuring circuits of several functional units in telecommunication, and particularly telephone exchange systems.

In telephone exchange systems frequently several functional units, e.g. central control devices, are provided which contain time-measuring circuits to derive different switching processes. Only after a time, predetermined by the timing circuit, is a switching process carried out. If such a timing circuit fails the desired switching process is omitted. The failing device remains seized and is not identified as having failed, if the time-measuring process is included in a compulsory sequence of a predetermined controlling program. Parts of the system may be blocked and traffic handling can be severely limited, because the trouble has not been signalled.

It is, therefore, a primary object of the invention to provide a method and a circuit arrangement for central supervision of timing circuits belonging to the several functional units in a telecommunication system, and particularly to a telephone exchange system, so that troubles in these circuits can be detected and reported in a simple manner.

The invention is characterized in that a supervising pulse spaced between a starting pulse and a final pulse, is generated and fed in parallel to all functional units. At the beginning and at the end of the supervising pulse the switching condition of actuated timing circuits is checked, and trouble is indicated when a particular operative condition occurs during both testing processes. It is necessary that the central supervising pulse be of longer duration than the maximum switching time produced by timing circuits being checked. Through central checking of the switching condition, each timing circuit can be investigated individually.

A circuit arrangement to carry out the invention and to provide central supervision of timing circuits for several functional units in telecommunication, particularly telephone exchange systems characterized in that a central timing circuit is provided to generate a central supervising pulse, determined by a starting pulse and a final pulse. Two switching means are associated with each of the timing circuits to be supervised. The first of these switching means is controlled by coincidence of signals from the time measuring process and the starting pulse of the central pulsing sender. The second switching means is actuated in dependence on the continued operation of the first switching means at the time of receipt of the final pulse of the central pulse sender. When the second switching means responds, trouble or failure of the respective timing circuit is reported. A suitable construction of the circuit arrangement according to the invention provides that for the transmission of the central supervising pulse two separate bus bars are provided through which the starting pulse is led to the first switching means and the final pulse to the second switching means of all time measuring circuits.

According to a further embodiment of the invention, the trouble report or indication is made so that the switching means of the individual functional units have separate holding circuits independent of the central supervising pulse and the holding circuits depend on the operative condition of the timing circuit. To avoid mutual influence of the switching means associated with the functional units, it is, moreover, provided that the control leads, leading to the individual functional units, are electrically decoupled via rectifiers.

The method and the circuit arrangement for central supervision of timing circuits of several functional units according to the invention is now in detail explained with reference to an example, shown on the accompanying drawing.

In the drawing, the central timing pulse sender ZTG, from which the control or supervisory period may be determinal by the length of central timing pulse T is indicated at block 2. It can be made in any way known to the art, and is essentially a device for producing trains of pulses, such as B and E, which may be supplied on separate output terminals, such as 1 and 3. The central supervising pulse T is determined or bounded in the example by a starting pulse B and a final pulse E. The length of time between pulses B and E is predetermined and is set to exceed the normal period of the timing circuits TV as indicated by operation of the switching means X and Y associated with the timing circuits TV present in individual functional units such as E*x* in block 4. As indicated by the control multiples S*t*V and S*tp*V the central timing pulse sender ZTG feeds several functional units E*x* (indicated by blocks E*x*) which all include timing circuits TV with switching means S and check switching means such as X and Y. Both checking processes according to the method of the invention are performed as follows:

The starting pulse B is applied via the control multiple S*t*V to the terminal 1. The check switching means X will respond only if contact *b*1 of the seizing means *b* is closed to indicate the timing process is being carried out. This process in turn is dependent upon closure of the contact *b*2 of the seizing means *b*. The timing process of timing circuit TV is started in response to a starting signal at terminal 8, with closure of *b*1 and *b*2. The control lead S*t*V is connected via terminal 1 and closed contact *b*2 to the check switching means X. Means X then closes contacts *x*1 and *x*2.

Switching means X closes the contact *x*1 to provide its own holding circuits, as long as the timing process is going on as indicated by closed contacts *b*1 and *b*2.

Typically, the seizing means *b* is a relay which, once actuated by a signal on terminal 8, will be kept actuated so long as there is an output signal from timing circuits TV via line 10 over its own holding circuit.

When the end of the checking pulse T, i.e. pulse E, arrives, the switching means Y will operate if *b*2 is closed showing that the timing process is still going on. If response is in the affirmative in this manner, the timing circuit TV has failed, because the central supervising pulse T is chosen to have a longer duration than the switching period of the timing circuit TV.

When the timing signal from timing circuits TV has been completed, indicating that TV is operating properly, seizing means $b$ will release and the switching means X will be released because the contacts $b1$ and $b2$ will be open. Also, through contacts $x2$, the control lead S$tp$V to the switching means Y will be disconnected, when the central timing pulse sender ZTG applies the final pulse E.

When the timing circuit TV has failed, the program of the functional unit E$x$ is stopped. At the end of the supervising pulse T contact $b2$ is still closed and, consequently, the switching means X is still energized. Contact $x2$ through-connects the control multiple S$tp$V to the switching means Y. Said switching means Y is energized via the final pulse E and a holding circuit is closed through contact $y1$ which is independent of the central supervising pulse T, but dependent on the program rundown in the troubled functional unit E$x$, as indicated by the contact $b1$, inserted in the holding circuit. Contact $y2$ provides a ground at a terminal identified as A, S$p$ which can then operate an alarm, or indicator showing the failure of the system.

The example herein described only represents a possibility to realize the method according to the invention, a plurality of variants is possible, even purely electronic switching means which, however, are all based on the principal idea of the invention namely at the commencement and at the end of a centrally generated supervising pulse all timing circuits of several functional units are checked in parallel.

What is claimed is:

1. A method for centrally supervising timing circuits of a functional unit in a telecommunication system comprising:

generating a supervising pulse,
supplying said pulse to a functional unit at the beginning and the ending of a predetermined time period,
determining whether the functional unit is operable in response to the pulse at the beginning and at the ending of the predetermined time period, and
signalling trouble when the functional unit is operating in the same manner at the beginning and at the ending of the predetermined time period.

2. A method according to claim 1 in which the predetermined time period is of longer duration than the maximum switching period of the functional unit.

3. A circuit for supervising time measuring circuits of functional units, comprising means for generating a supervising pulse including a starting pulse and a final pulse,
a timing circuit to be supervised,
first and second switching means associated with said timing circuit,
said first switching means responding to said starting pulse to close and then remain closed during a period in which said timing circuit continues to operate,
said second switching means closing in response to the occurrence of said final pulse at a time when the first switching means is in a state indicating deviation of the timing circuit from desired behavior,
the closure of said second switching means causing the closure of further means capable of providing a signal indicating trouble in the timing circuit.

4. A circuit as claimed in claim 3, in which
a plurality of timing circuits are present,
each timing circuit includes a first and second switching means,
said supervising pulse is supplied over first and second bus bars,
said first bus bar supplies the starting pulse to each of said first switching means, and
said second bus bar supplies the final pulse to each of said second switching means.

5. A circuit as claimed in claim 4, in which
each of the switching means of each of the timing circuits includes separate holding circuits which hold independently of the supervising pulse.

6. A circuit as claimed in claim 5, in which
the timing circuits include a holding circuit upon which holding circuits of the first and second switching means individually and jointly depend.

7. A circuit arrangement as claimed in claim 4, in which
the first and second switching means are decoupled from the bus bars by rectifiers.

No references cited.

KATHLEEN H. CLAFFY, *Primary Examiner.*

A. A. McGILL, *Assistant Examiner.*